(12) United States Patent
Keigley (10) Patent No.: US 11,904,645 B1
(45) Date of Patent: Feb. 20, 2024

(54) ADJUSTABLE HITCHES FOR COUPLING SURFACE CONDITIONING TOOLS AND WORK MACHINES

(71) Applicant: ABI ATTACHMENTS INC., Mishawaka, IN (US)

(72) Inventor: Kevin V. Keigley, Osceola, IN (US)

(73) Assignee: ABI Attachments Inc., Mishawaka, IN (US)

( * ) Notice: Subject to any disclaimer, the term of this patent is extended or adjusted under 35 U.S.C. 154(b) by 724 days.

(21) Appl. No.: 16/952,379

(22) Filed: Nov. 19, 2020

Related U.S. Application Data (60) Provisional application No. 62/937,518, filed on Nov. 19, 2019.

(51) Int. Cl.
*B60D 1/155* (2006.01)
*A01B 31/00* (2006.01)
*B23Q 1/54* (2006.01)

(52) U.S. Cl.
CPC .............. *B60D 1/155* (2013.01); *A01B 31/00* (2013.01); *B23Q 1/5462* (2013.01)

(58) Field of Classification Search
CPC ......... B23Q 1/5462; B27L 7/06; B60D 1/155; A01B 31/00
See application file for complete search history.

(56) References Cited

U.S. PATENT DOCUMENTS

| | | | |
|---|---|---|---|
| 1,601,542 A * | 9/1926 | Schermuly | A01B 31/00 172/686 |
| 1,674,306 A | 6/1928 | Shaw | |
| 1,865,812 A | 7/1932 | Anderson | |
| 2,560,711 A | 7/1951 | Arps | |
| 2,888,997 A | 6/1952 | Fraga | |
| 2,620,716 A * | 12/1952 | Ciancio | A01B 63/10 37/417 |
| 2,642,294 A | 6/1953 | Holm | |
| 2,762,138 A | 9/1956 | Beam | |
| 2,960,346 A | 11/1960 | Hunter | |

(Continued)

*Primary Examiner* — Jessica H Lutz (74) *Attorney, Agent, or Firm* — Taft Stettinius & Hollister LLP (57) ABSTRACT

An apparatus comprises a first elongate member configured to detachably and fixedly couple with a work machine in a tow-behind configuration, a two-axis joint member coupled with the first elongate member at a first joint permitting rotation of the two-axis joint member relative to the first elongate member about a first axis of rotation, a rigid frame portion including a second elongate member coupled with the two-axis joint member at a second joint permitting rotation of the second elongate member relative to the two-axis joint member about a second axis of rotation perpendicular to the first axis of rotation and a third elongate member extending perpendicular to the second elongate member, a surface conditioning tool extending parallel to the third elongate member and coupled with the rigid frame portion at a third joint and at a fourth joint permitting rotation of the surface conditioning tool relative to the rigid frame portion about a third axis of rotation parallel to the second axis of rotation, and a variable-length tool coupling member coupled with the rigid frame portion at a fifth joint and coupled with the surface conditioning tool at a sixth joint.

20 Claims, 10 Drawing Sheets

(56) References Cited

U.S. PATENT DOCUMENTS

| | | | |
|---|---|---|---|
| 3,069,792 A | 12/1962 | Ryals | |
| 3,525,201 A | 8/1970 | Kaufman | |
| 3,613,802 A | 10/1971 | Carlson | |
| 3,666,020 A | 5/1972 | Hess | |
| 3,739,860 A | 6/1973 | Rogers | |
| 3,808,739 A | 5/1974 | Newgent | |
| 3,823,781 A | 7/1974 | Check et al. | |
| 4,561,797 A | 12/1985 | Aldridge | |
| 4,583,307 A | 4/1986 | Lenert | |
| 4,651,450 A | 3/1987 | York et al. | |
| 4,651,451 A | 3/1987 | Beeley et al. | |
| 4,805,322 A | 2/1989 | Lemire | |
| 4,840,233 A | 6/1989 | Friggstad | |
| 4,989,676 A | 2/1991 | Rogers | |
| 5,007,485 A * | 4/1991 | Moss | A01B 31/00 172/612 |
| 5,407,014 A * | 4/1995 | Tranmer | A01B 19/02 172/197 |
| 5,465,510 A | 11/1995 | Goodnough et al. | |
| 5,497,569 A | 3/1996 | Byman | |
| 5,890,545 A | 4/1999 | Smith et al. | |
| 6,209,231 B1 | 4/2001 | Curtis | |
| 6,902,182 B1 | 6/2005 | Kamunen | |
| 7,464,528 B1 | 12/2008 | Street et al. | |
| 7,478,682 B1 | 1/2009 | Keigley | |
| 7,540,331 B1 * | 6/2009 | Keigley | A01B 73/00 172/195 |
| 9,545,050 B2 | 1/2017 | Fichera | |
| 10,765,053 B1 * | 9/2020 | Keigley | A01B 31/00 |
| 2014/0262387 A1 | 9/2014 | Schmidt et al. | |

* cited by examiner

ADJUSTABLE HITCHES FOR COUPLING SURFACE CONDITIONING TOOLS AND WORK MACHINES

CROSS REFERENCE

The present application claims the benefit of and priority to U.S. Application No. 62/937,518 filed Nov. 19, 2019 the disclosure of which is hereby incorporated by reference.

BACKGROUND

The present disclosure relates generally to adjustable hitches for coupling surface conditioning tools with work machines. A number of hitches have been proposed for surface conditioning tools for maintaining playing surfaces such as a baseball infield and warning track surfaces, equine arenas, and other athletic or sporting surfaces as well as landscaping and grading applications. Heretofore, such hitches have suffered from a number of drawbacks and disadvantages. There remains a substantial need for the unique apparatuses, systems, and methods disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique adjustable hitch for coupling a surface conditioning tool and a work machine. In certain forms a hitch includes a first elongate member configured to detachably couple with a work machine in a tow-behind configuration, a two-axis joint member coupled with the first elongate member at a first joint permitting rotation of the two-axis joint member relative to the first elongate member about a first axis of rotation and a rigid frame portion including a second elongate member coupled with the two-axis joint member at a second joint permitting rotation of the second elongate member relative to the two-axis joint member about a second axis of rotation perpendicular to the first axis of rotation and a third elongate member extending perpendicular to the second elongate member. Other embodiments, forms, objects, features, advantages, aspects, and benefits shall become apparent from the following description and drawings.

DETAILED DESCRIPTION OF ILLUSTRATIVE EMBODIMENTS

Figure 1:
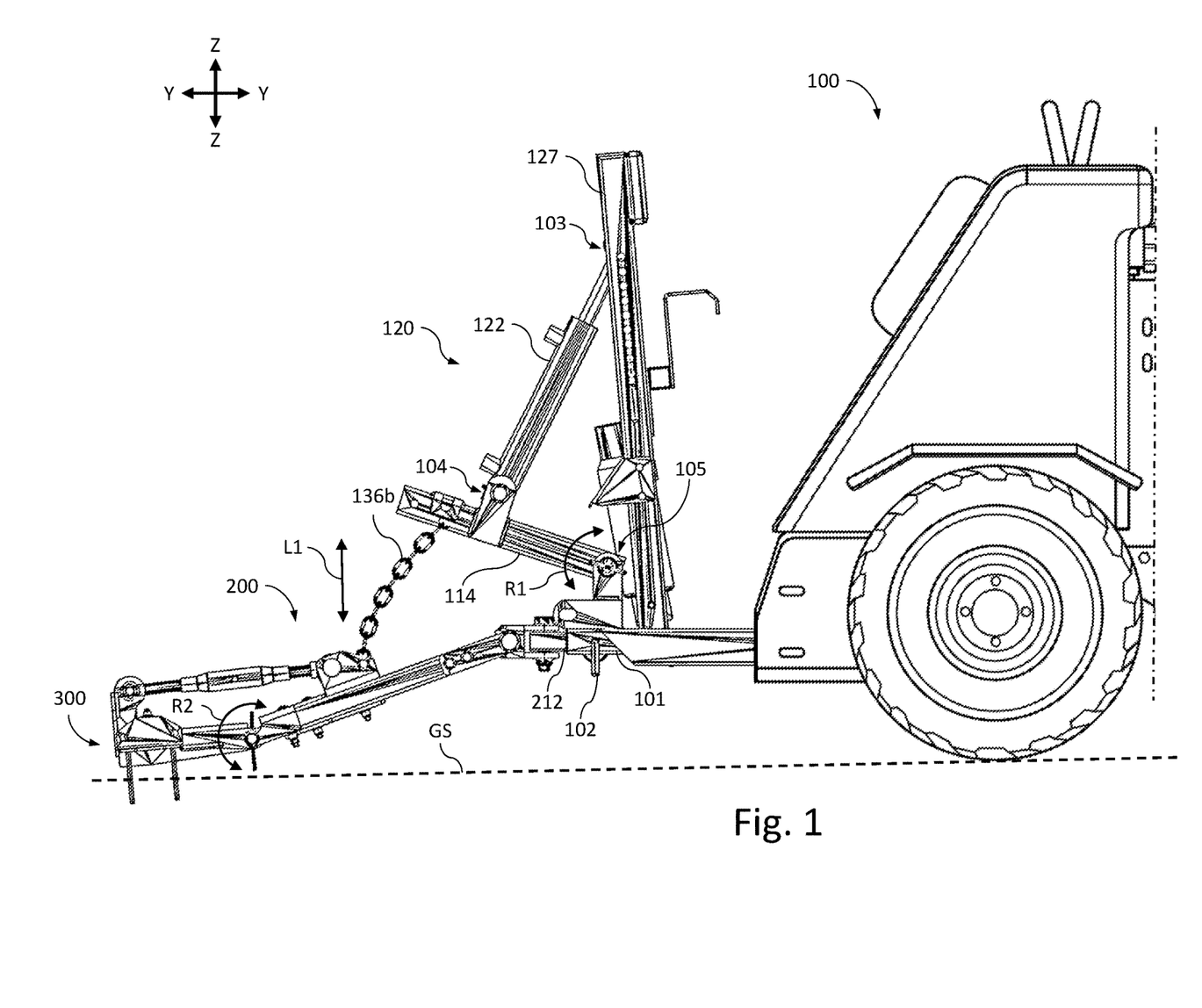
FIG. 1 is a side view of an articulating pitch-adjustable hitch coupled with a work machine and a surface conditioning tool.
Figure 2:
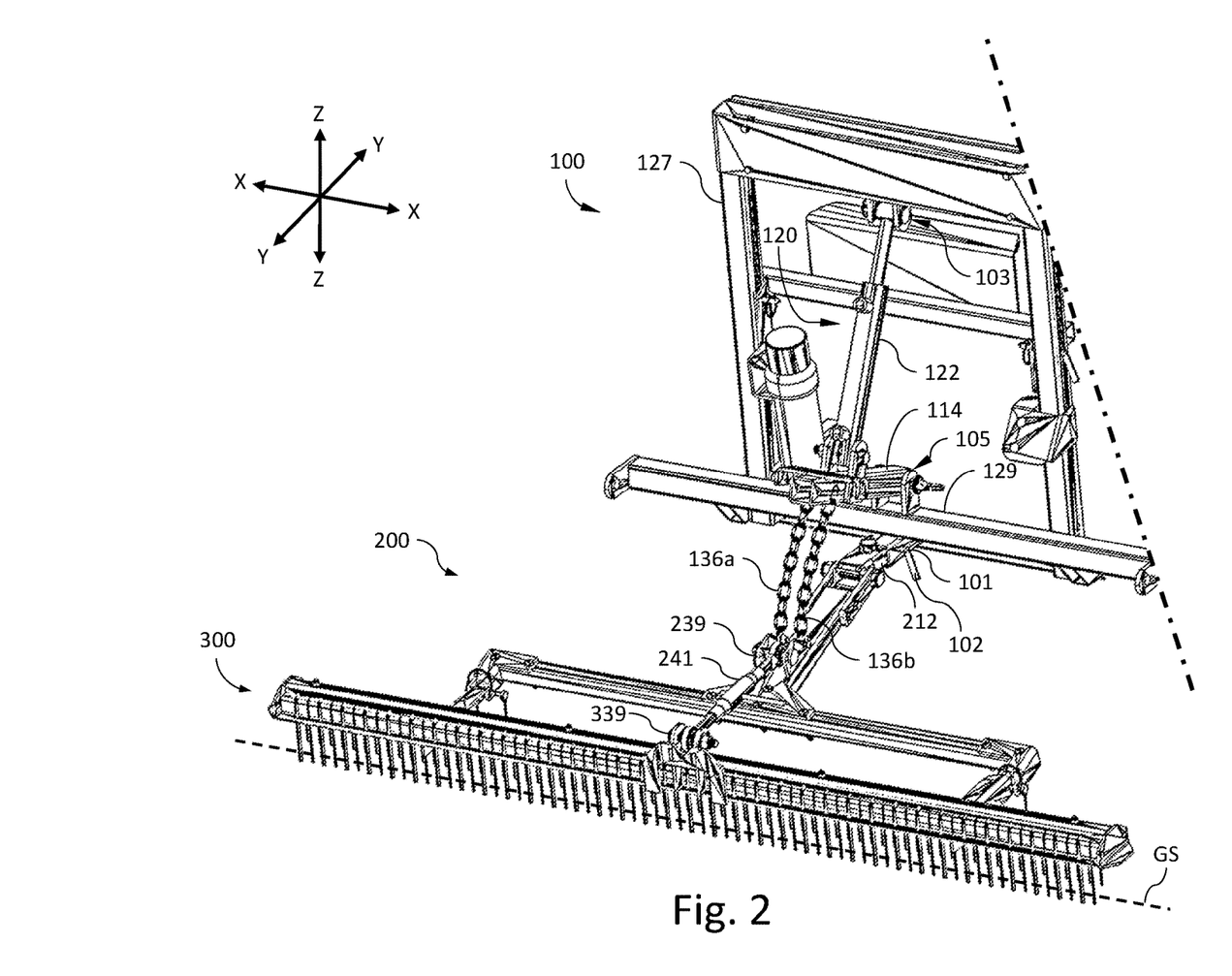
FIG. 2 is a perspective view of the example articulating pitch-adjustable hitch of FIG. 1 coupled with the work machine and the surface conditioning tool.

Referring now to the figures and initially to FIGS. 1 and 2 in particular, there is illustrated an example embodiment of an articulating pitch-adjustable hitch 200 coupled with a work machine 100 and a surface conditioning tool 300. For purposes of brevity, the present disclosure may refer to the articulating pitch-adjustable hitch 200 as hitch 200 and may refer to the surface conditioning as tool 300. In the illustrated embodiment, the hitch 200 is detachably coupled with the work machine 100 by a first rigid elongate member 212 which is inserted into a hitch receiver 101 and by a pin 102 which passes through apertures formed in the hitch receiver 101 and the first rigid elongate member 212 to maintain these components in a fixed relationship when coupled but also permit in-field detachment or decoupling from the fixed relationship without requiring use of tools. In the illustrated embodiment, the first rigid elongate member 212 is configured as a hitch shank configured and sized to be inserted into the hitch receiver 101. In other embodiments, the first rigid elongate member 212 may be provided in other forms and the hitch 200 may be detachably, fixedly coupled with the work machine 100 using a variety of other types of couplings and fasteners as would occur to one of skill in the art with the benefit of the present disclosure. In each of these various forms, the first rigid elongate member 212 is configured to detachably and fixedly couple with the work machine 100 in a tow-behind configuration.

In the illustrated embodiment, the work machine 100 is a zero-turn radius work machine. In certain forms, the work machine 100 may be configured as a zero-turn radius work machine as described in U.S. Pat. Nos. 9,332,687 and 9,883,621 the disclosures of which are incorporated herein by reference. In other embodiments, various other types of work machines may be utilized, such as other types of zero-turn radius work machine, a riding lawnmower, a lawn tractor, and ATV or a variety of other types of work machines capable of towing a work tool.

The work machine 100 includes an actuator 120 comprising a hydraulic cylinder 122 which is coupled with a lifting member 114 at a joint 104 which permits rotation of the hydraulic cylinder 122 relative to the lifting member 114. Hydraulic cylinder 122 is also coupled with a vertically extending operator support member 127 of the work machine 100 at a joint 103 which permits rotation of the hydraulic cylinder 122 relative to the operator support member 127. The lifting member 114 is coupled with a frame member 129 of the work machine 100 at a joint 105 which permits rotation of the lifting member 114 relative to the frame member 129. A first flexible rigging member 136a is coupled with and extends between the lifting member 114 and the hitch 200. In the illustrated embodiment a second flexible rigging member 136b is coupled with and extends between the lifting member 114 and the hitch 200. In other embodiments, a single flexible rigging member may be utilized. In the illustrated embodiment, the flexible rigging members 136a and 136b comprise lengths of chain. In other embodiments, the flexible rigging members 136a and 136b may comprise cables, lines, ropes, wires or other types of flexible rigging members.

The actuator 120 is adjustable and actuatable by selectably supplying pressurized hydraulic fluid from hydraulic fluid lines (not illustrated) which are configured to supply pressurized hydraulic fluid to the actuator 120 to expand or contract the length of the hydraulic cylinder 122. Such adjustment of the actuator 120 causes the lifting member 114 to rotate about the joint 105 in the direction indicated by arrow R1. Starting with the lifting member 114 in a lowered positioned in contact with an underlying ground surface GS, such rotation is first effective to reduce slack in the flexible rigging members 136a and 136b and is second effective to raise the lifting member 114 and the hitch 200 above the underlying ground surface GS. Thus once the flexible rigging members 136a and 136b become taut, upward rotation is effective further raise the lifting member 114 to cause a corresponding rotation and raising of portions of the hitch 200 and the tool 300 relative to an underlying ground surface GS and also relative to in the direction generally indicated by arrow L1.

The hitch 200 is coupled with the surface conditioning tool 300 by a three-point connection. In the illustrated embodiment, the three-point connection includes joints 223a, 223b which couple the hitch 200 with the tool 300. The joints 223a, 223b permit rotation of the tool 300 relative to the hitch 200 along an axis A1 extending in an X-axis direction in the direction generally indicated by arrow R2 permitting the pitch of tool 300 to be adjusted relative to the X-Y plane of the illustrated X-Y-Z coordinate system. The three-point connection further includes top link 241 which is coupled with the hitch 200 and the tool 300. It shall be appreciated that the top link 241 is one example of a variable-length tool coupling member. In other embodiments, a variable-length tool coupling joint member may be provided in other forms, for example, an electrically or hydraulically actuated link. In other embodiments, a fixed-length tool coupling member may be used in place of the top link 241 or other variable-length tool coupling members.

It shall be appreciated that the top link 241 or another variable-length tool coupling member or a fixed length tool coupling member may be provided as a component of the hitch 200 or the tool 300. In some applications, it may be preferred to provide a separate dedicated variable-length or fixed length tool coupling member for each of a plurality of tools. Providing separate dedicated tool coupling members may facilitate the ease with which different tools may be swapped out from the hitch 200 by mitigating or eliminating the need for readjustment of the tool coupling member to accommodate different types of tools.

Figure 4:
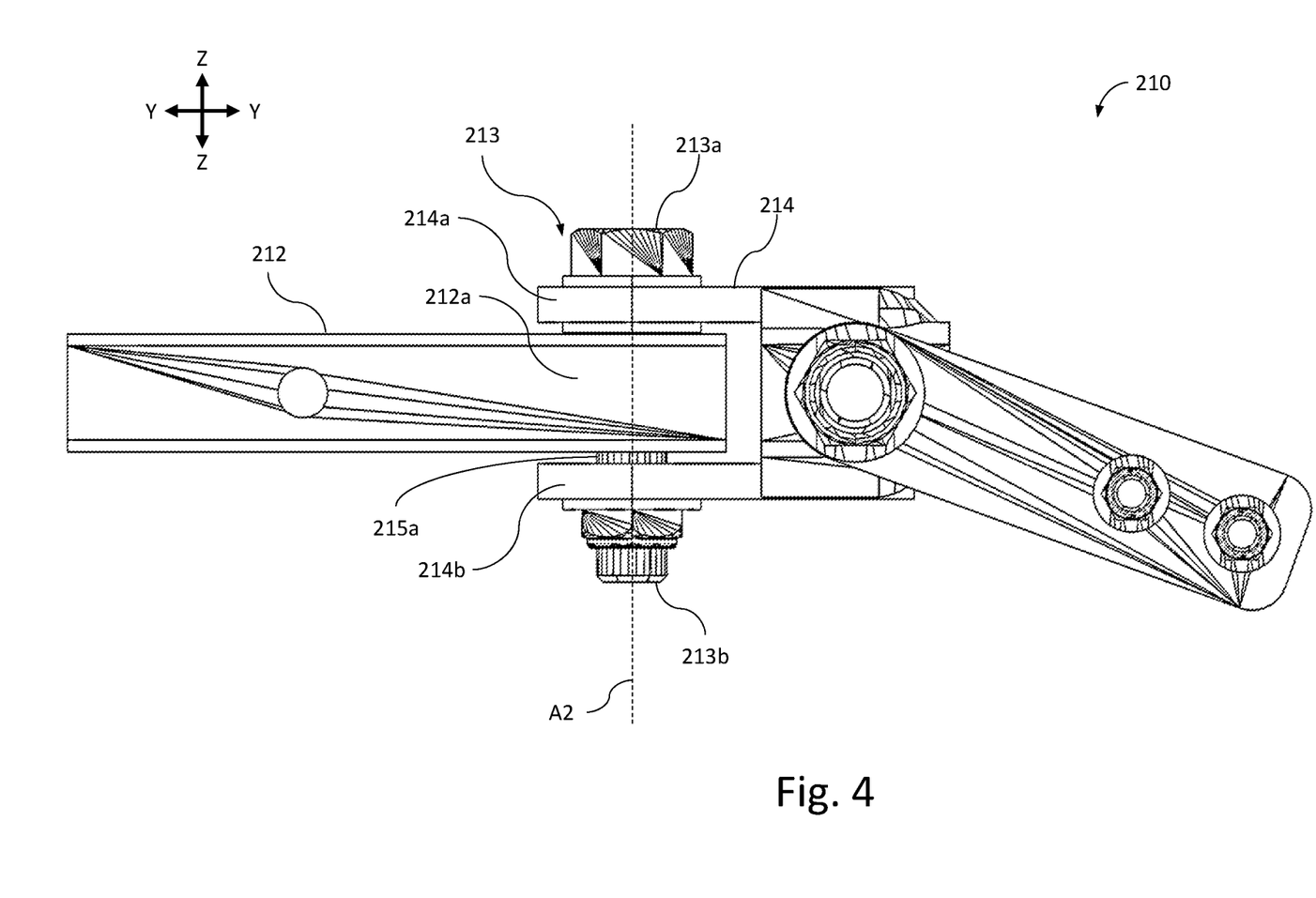
FIG. 4 is a side view of a portion of the example articulating pitch-adjustable hitch of FIG. 1
Figure 5:
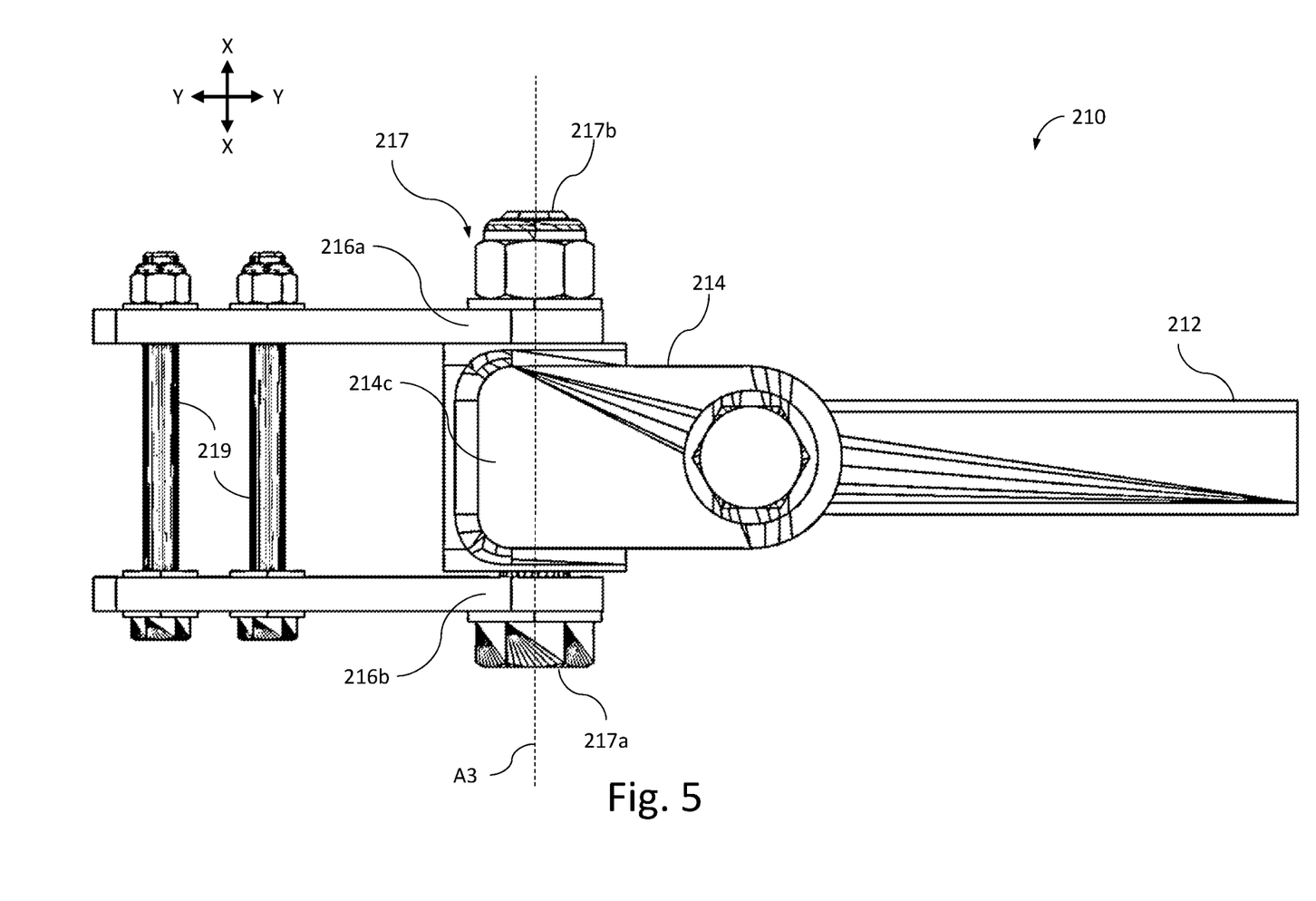
FIG. 5 is a top view of a portion of the example articulating pitch-adjustable hitch of FIG. 1

The hitch 200 includes a dual-axis joint assembly 210 including a first rigid elongate member 212, a two-axis joint member 214, and a second rigid elongate member 216 which are jointedly coupled to one another to provide a two-axis joint assembly. The two-axis joint member 214 is coupled with the first rigid elongate member 212 at a joint 213 permitting rotation of the two-axis joint member 214 relative to the first rigid elongate member 212 about an axis of rotation A2 extending in the Z-axis direction permitting the angle of two-axis joint member 214 to be adjusted relative to the Y-Z plane of the illustrated X-Y-Z coordinate system. In the illustrated embodiment, joint 213 is formed by a pin bolt member 213a which passes through apertures in fork portions 214a, 214b of the two-axis joint member 214 and through an aperture in eye portion 212a of the first rigid elongate member 212 and is retained in place by a nut member 213b. In other embodiments, the joint 213 may be formed by other cooperating structures of the first rigid elongate member 212 and the two-axis joint member 214. In some such embodiment, for example, the first rigid elongate member 212 may be provided with a fork portion and the two-axis joint member 214 may be provided with an eye portion. In the illustrated embodiment the fork portions 214a, 214b are integrally formed with the two-axis joint member 214. In other embodiments, the fork portions 214a, 214b may be coupled with the two-axis joint member 214 by bolts or other fasteners or by welding. In any case, the fork portions 214a, 214b may be considered as and referred to as a portion of the two-axis joint member 214.

The second rigid elongate member 216 is coupled with the two-axis joint member 214 at a joint 217 permitting rotation of the second rigid elongate member 216 relative to the two-axis joint member 214 about an axis of rotation A3 extending in a extending in the X-axis direction perpendicular to an the of rotation A2 permitting the pitch of the second rigid elongate member 216 to be adjusted relative to the X-Y plane of the illustrated X-Y-Z coordinate system. In the illustrated embodiment, the joint 217 is formed by a pin bolt member 217a which passes through apertures in fork portions 216a, 216b and through an aperture in eye portion 214c of the two-axis joint member 214 and is retained in place by nut member 217b. In other embodiments, the joint 216 may be formed by other cooperating structures of the two-axis joint member 214 and the second rigid elongate member 216. In some such embodiment, for example, the two-axis joint member 214 may be provided with a second fork portion and second rigid elongate member 216 may be provided with an eye portion. In the illustrated embodiment the fork portions 216a, 216b are coupled with the second rigid elongate member 216 by bolts 219. In other embodiments, the fork portions 216a, 216b are coupled with the second rigid elongate member 216 by other fasteners, by welding, or by being integrally formed with the second rigid elongate member 216. In either case the fork portions 216a, 216b may be considered as and referred to as a portion of the second rigid elongate member 216.

The second rigid elongate member 216 is further coupled with a third rigid elongate member 218 extending perpendicular to and coupled with the second rigid elongate member 216 at a central location of the third elongate member 218 to provide a rigid frame portion 220. The rigid frame portion 220 extends longitudinally rearward from the two-axis joint member 214 and extends laterally outward in first and second directions from a rearward location along the rigid frame portion 220 which is spaced apart from and rearward of the two-axis joint member 214. Through the action of dual-axis joint assembly 210, the rigid frame portion 220 is adjustable over two degrees of freedom relative to the first rigid elongate member 212 as well as relative to the work machine 100 when the first rigid elongate member 212 is fixedly rigidly coupled to the work machine 100 such that the pitch of the rigid frame portion 220 can be adjusted relative to the X-Y plane and the angle of the rigid frame portion 220 can be adjusted relative to the Y-Z plane of the illustrated X-Y-Z coordinate system.

Figure 3:
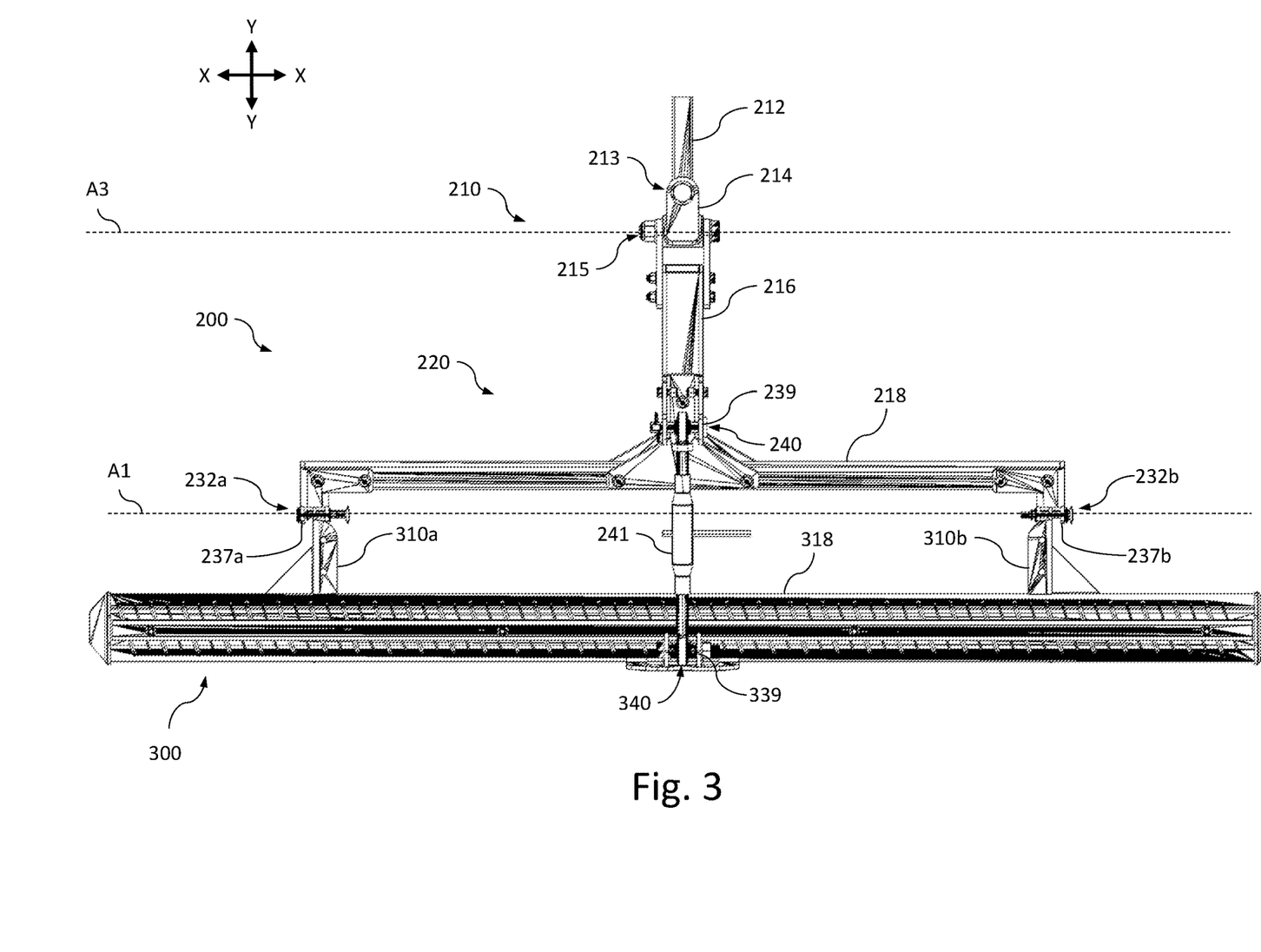
FIG. 3 is a top view of the example articulating pitch-adjustable hitch of FIG. 1 coupled with the surface conditioning tool.

In the illustrated embodiment, the lateral and longitudinal extent and positioning of the second rigid elongate member 216 and the third rigid elongate member 218 of the rigid frame portion 220 are configured to permit adjustment of the angle of the rigid frame portion 220 relative to the Y-Z plane, if not otherwise limited or constrained, up to the position where the lateral extremities of the third rigid elongate member 218 contact or are adjacent to a rear portion of the work machine 100. This range of motion is preferably at least plus or minus 30 degrees of rotation relative to the Y-Z plane. In the illustrated embodiment this range of motion is provided by the rigid frame portion 220 being configured as a T-shaped frame portion. In other embodiments the rigid frame portion 220 may be provided in other shapes and configurations providing the same or a similar a range of motion, for example, a triangular shape, a truncated triangular shape, a trapezoidal shape, a curved buttress shape, a flying buttress shape, or other shapes as would occur to one of skill in the art with the benefit of the present disclosure.

Figure 6:
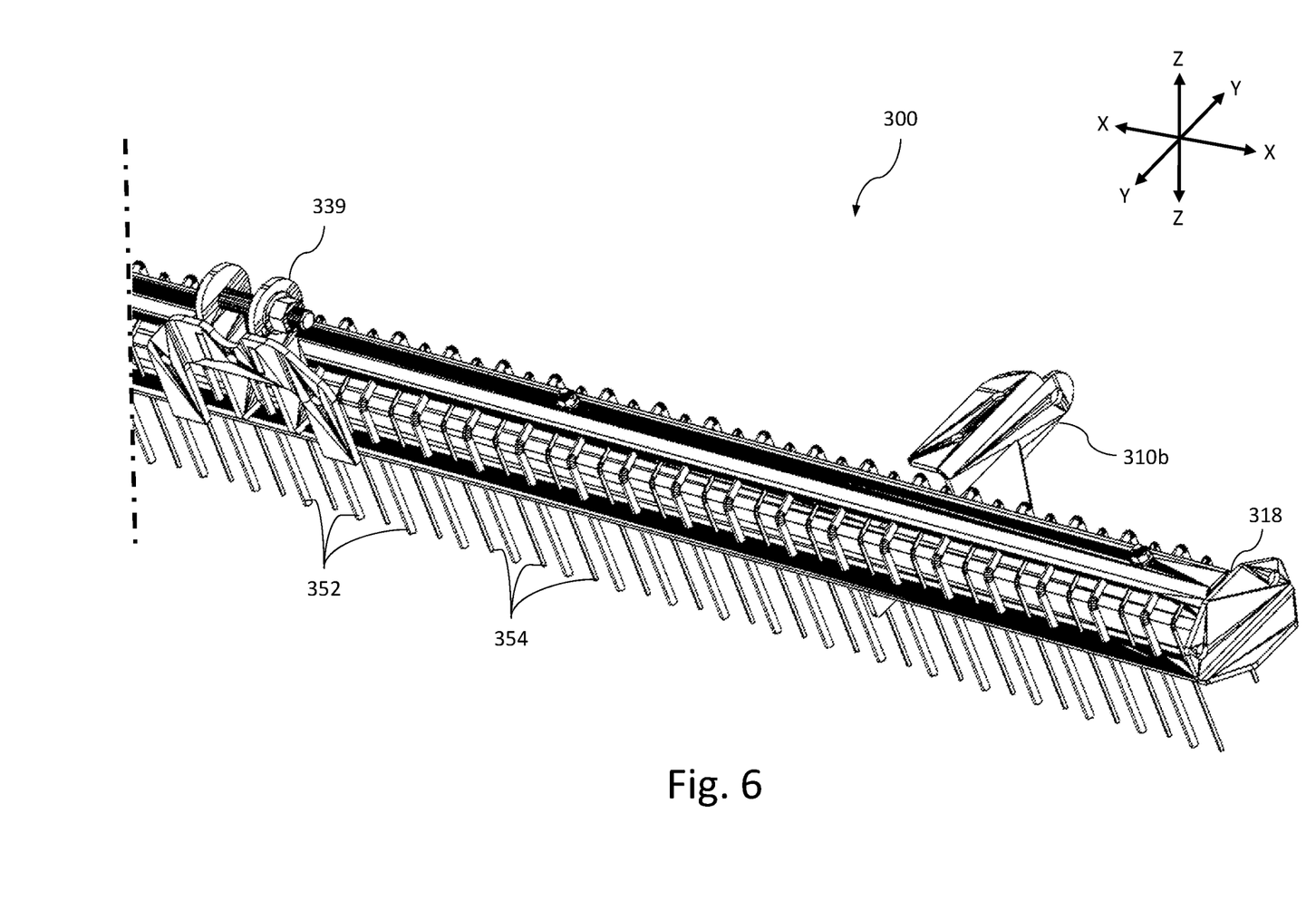
FIG. 6 is a perspective view of a portion of the surface conditioning tool of FIG. 1.

The surface conditioning tool 300 includes an elongate tool body 318 which extends parallel to the third elongate member 218 and is coupled with the rigid frame portion 220 via the aforementioned three-point connection including the third joint 232a and the fourth joint 232b. The third joint 232a couples a joint member 237a which extends rearward from the third rigid elongate member 218 with a joint member 310a which extends forward from the elongate tool body 318. The fourth joint 232b couples a joint member 237b which extends rearward from third rigid elongate member 218 with a joint member 310b which extends forward from elongate tool body 318. The third joint 232a and the fourth joint 232b are configured to permit rotation of the surface conditioning tool 300 relative the rigid frame portion 220 about the axis of rotation A1. The three-point connection is further established by the top link 241 which is coupled with the rigid frame portion 220 at a fifth joint 240 coupling the top link 241 and a joint member 239 which extends from the rigid frame portion 220 and coupled with the surface conditioning tool at a sixth joint 340 coupling the top link 241 and the joint member 339 which extends from elongate tool body 318.

In the illustrated embodiment, the surface conditioning tool 300 is configured as a pin drag including a first plurality of pins 352 of a first gauge or diameter and a second plurality of pins of a second gauge or diameter, smaller than the first gauge or diameter which extend downward from elongate tool body 218. In other embodiments, the surface conditioning tool 300 may be any of a variety of surface conditioning drag tools which are configured to be coupled with and towed behind a work machine, such as the work machine 100. For example, the surface conditioning tool 300 may comprise various brooms, brushes, nail drags, flexible drag mats or other types of surface conditioning or grooming drags such as other types of baseball infield grooming drag tools, cocoa mats, chain drags, chain harrows, equine drags, bunker rakes, segmented cone drags, and combinations thereof.

The coupled combination of hitch 200, the work machine 100, and surface conditioning tool 300 is adjustable over a number of ranges into a number of positions or configurations. Such adjustment may include active adjustment, passive adjustment and combined active/passive adjustment. In the illustrated embodiment, active adjustment may be accomplished by operating actuator 120 to raise and lower lifting member 114 and passive adjustment may be accomplished in response to the turning of the work machine 100.

In the state of adjustment illustrated in FIG. 1, the actuator 120 has been controlled to position the lifting member 114 such that the surface conditioning tool 300 contacts the underlying ground surface GS. Additionally, the flexible rigging members 136a, 136b are provided with a first degree of slack depicted by the curvature of the flexible rigging member 136b. The first degree of slack is effective to permit a first range of rotation of the two-axis joint member 214 and the other components coupled therewith (e.g. rigid frame portion 220 and surface conditioning tool 300) relative to the first rigid elongate member 212 about the axis of rotation A2. The presence of slack in the flexible rigging members 136a, 136b allows rotation effective to take-up slack up to a degree of rotation where at least one of the flexible rigging members 136a, 136b becomes taut thereby limiting further rotation.

From the state of adjustment illustrated in FIG. 1, the actuator 120 may be controlled to lower lifting member 114 to lower position wherein the amount of slack in flexible rigging members 136a, 136b is increased allowing increased rotation effective to take-up the increased slack. The increased degree of rotation may be constrained when at least one of the flexible rigging members 136a, 136b becomes taut thereby limiting further rotation. In one such state of adjustment, the lifting member 140 is adjustable to a lowermost position wherein the surface conditioning tool 300 contacts the underlying ground surface GS and the flexible rigging members 136a, 136b are provided with a degree of slack effective to permit a maximum range of rotation of the two-axis joint member 214 relative to the first rigid elongate member 212 about the axis of rotation A1. In certain forms, the third range of rotation may permit rotation of at least plus or minus 30 degrees. In certain forms, the third range of rotation permits the surface conditioning tool 300 to work a portion of underlying ground surface GS about a centrally positioned circle with a radius of 2 feet or less. Such rotation of the two-axis joint member 214 and the other components coupled therewith relative to the first rigid elongate member 212 may occur passively in response to turning of the work machine 100.

From the state of adjustment illustrated in FIG. 1, the actuator 120 may be also controlled to raise the lifting member 114 to position wherein the surface conditioning tool 300 is raised above an underlying ground surface GS and supported at least in part by the flexible rigging members 136a, 136b. In this state of adjustment, the flexible rigging members 136a 137b are taut effective to prevent or limit rotation of the two-axis joint member 214 and the other components coupled therewith relative to the first rigid elongate member 212 about the axis of rotation A2. This configuration may be maintained over a range of motion from a maximally raised position of lifting member 114 down to and including to a position where surface conditioning tool 300 comes into contact with the underlying ground surface GS with flexible rigging members 136a 137b being taut. Additionally, if surface conditioning tool 300 and rigid frame portion 220 are raised from an angled position, the act of raising these components is effective to return them to a substantially straight or non-angled position.

It shall be appreciated that the lifting member 140 is adjustable to a first example position wherein the surface conditioning tool 300 is raised above the underlying ground surface GS and supported at least in part by the flexible rigging members 136a, 136b. Furthermore, the lifting member 140 is adjustable to a second example position lower than the first example position wherein the surface conditioning tool 300 contacts the underlying ground surface GS and the flexible rigging members 136a, 136b are taut effective to prevent or limit rotation of the two-axis joint member 214 relative to the first rigid elongate member 212 about axis of rotation A2. Additionally, the lifting member 140 is adjustable to a third example position lower than the second example position wherein the surface conditioning tool 300 contacts the underlying ground surface GS and the flexible rigging members 136a, 136b are provided with a first degree of slack effective to permit a first range of rotation of the two-axis joint member 214 and the other components coupled therewith relative to the first rigid elongate member 212 about the axis of rotation A2. In addition the lifting member 140 is adjustable to a fourth example position lower than the third example position wherein the surface conditioning tool 300 contacts the underlying ground surface GS and the flexible rigging members 136a, 136b are provided with a second degree of slack effective to permit a second range of rotation of the two-axis joint member 214 and the other components coupled therewith relative to the first rigid elongate member 212 about the axis of rotation A2, the second range of rotation being greater than the first range of rotation.

It shall also be appreciated that, when the surface conditioning tool is in contact with the underlying ground surface GS, the lifting member 140 is adjustable over a first range of motion wherein the range of rotation of the two-axis joint member 214 and other components coupled therewith relative to the first rigid elongate member 212 about the axis of rotation A2 is varied in response to variation in the amount of slack present in the flexible rigging members 136a, 136b. Additionally, the lifting member 140 is adjustable over a second range of motion wherein the flexible rigging members 136a, 136b are taut effective to prevent or limit rotation of the two-axis joint member 214 and components coupled therewith relative to the first rigid elongate member 212 about the axis of rotation A2. This range includes positions wherein the surface conditioning tool 300 is raised above the underlying ground surface GS as well as positions wherein the surface conditioning tool 300 contacts the underlying ground surface GS. It shall be further appreciated that the pitch of tool relative 300 to the underlying ground surface GS is adjustable independently from the position of the lifting member 114 by varying the length of top link 241.

It shall be appreciated that the longitudinal length of the offset between the work machine 100 and the surface conditioning tool 300, the lateral width of the surface conditioning tool 300 and the degree of side-to-side articulation or angular rotation may be selected to provide an increase in useable turning radius of the combination of the work machine 100 and the surface conditioning tool 300. For example, the longitudinal length of the offset between the work machine 100 and the surface conditioning tool 300 may be selected to provide sufficient clearance between the work machine and the work tool for a predetermined turning radius. The width of the surface conditioning tool 300 and the degree of side-to-side articulation or sway may then be selected to ensure that the surface conditioning tool 300 travels over and covers the tracks left by the work machine 100.

Figure 7:
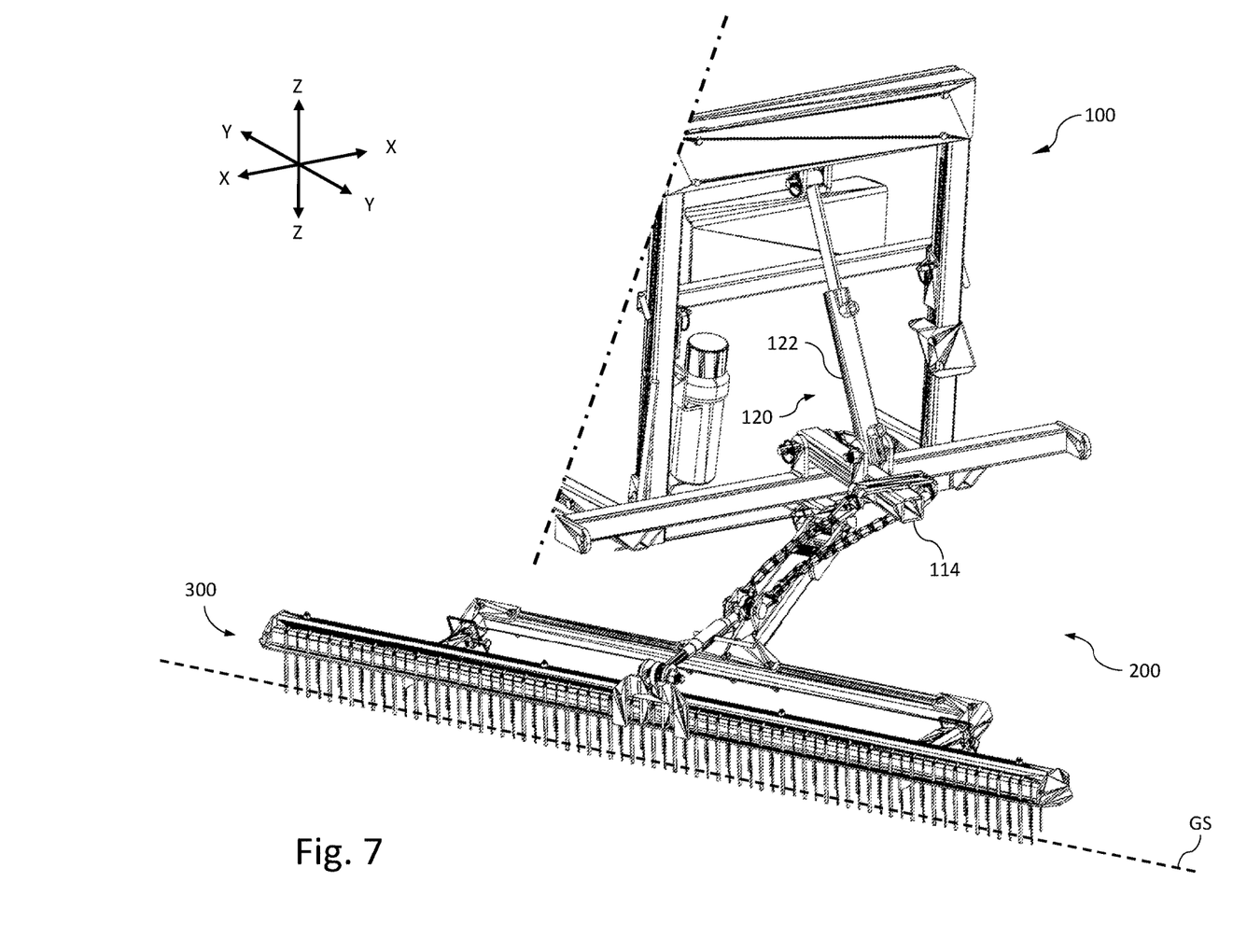
FIG. 7 is a perspective view of the example articulating pitch-adjustable hitch of FIG. 1 coupled with the work machine and the surface conditioning tool.

FIG. 7 illustrates the lifting member 114 rotated to a position in which the tool 300 is lowered to contact the underlying ground surface GS and rotated about axis A2 to a degree permitted by taking up slack in the flexible rigging members 136a, 136b. The degree of slack in flexible rigging members 136a, 136b permits rotation of hitch 200 and the tool 300 about axis A2. The hitch 200 and the tool 300 may be rotated about axis A2 during turning operation of the operation of work machine 100 over range including a plurality of lowered turned positions.

Figure 8:
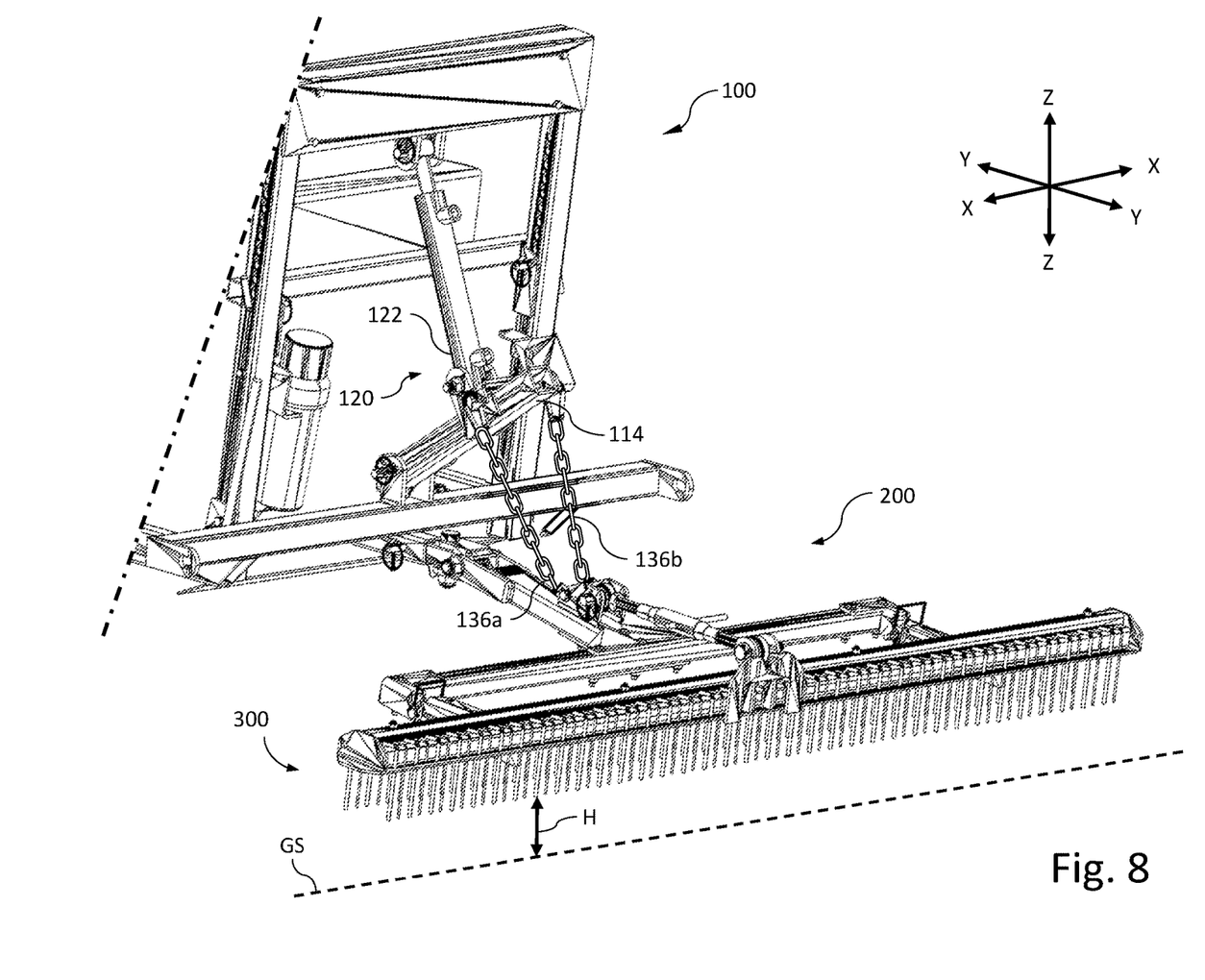
FIG. 8 is a perspective view of the example articulating pitch-adjustable hitch of FIG. 1 coupled with the work machine and the surface conditioning tool.

FIG. 8 illustrates the lifting member 114 rotated to a position in which the hitch 200 and the tool 300 are raised above the underlying ground surface GS by a distance H and are supported in this position by flexible rigging members 136a, 136b which are maintained in a taut configuration. The hitch 200 and the tool 300 may be raised and lowered between the position illustrated in FIGS. 1 and 2 to the position illustrated in FIG. 8 by adjustment of the actuator 120 to raise and lower the lifting member 141. Starting with the hitch 200 and the tool 300 in a lowered, turned position (e.g., the position illustrated in FIG. 7) lifting member 114 maybe rotated to raise the hitch 200 and the tool 300 to the position illustrated in FIG. 8. During the raising operation, as slack is taken up by flexible rigging members 136a, 136b, the hitch 200 and the tool 300 are moved from the turned position to a centered position and are urged toward the centered position when the hitch 200 and the tool 300 are raised.

Figure 9:
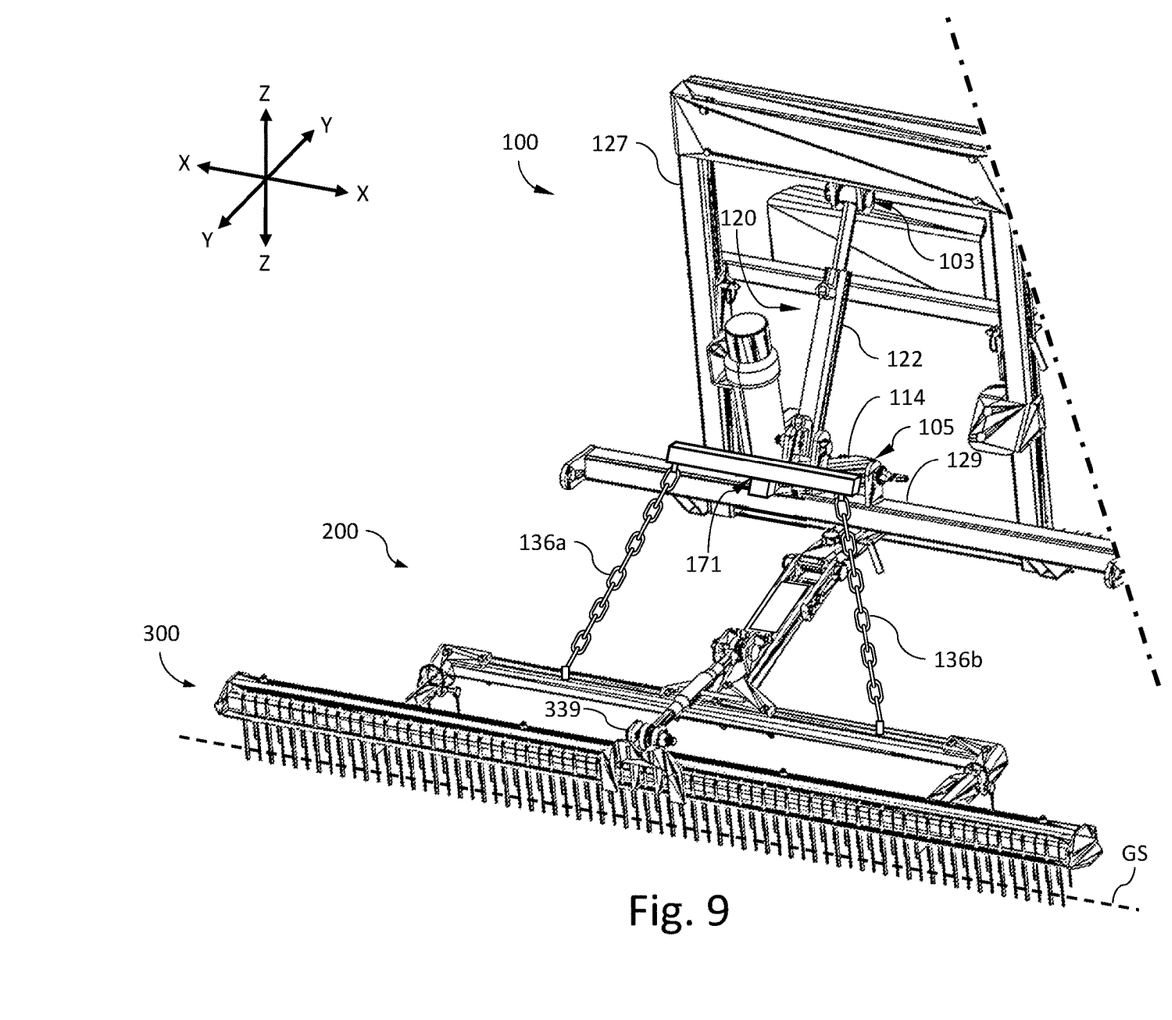
FIG. 9 is a perspective view of the example articulating pitch-adjustable hitch of FIG. 1 coupled with the work machine by a connector bar and coupled the surface conditioning tool.
Figure 10:
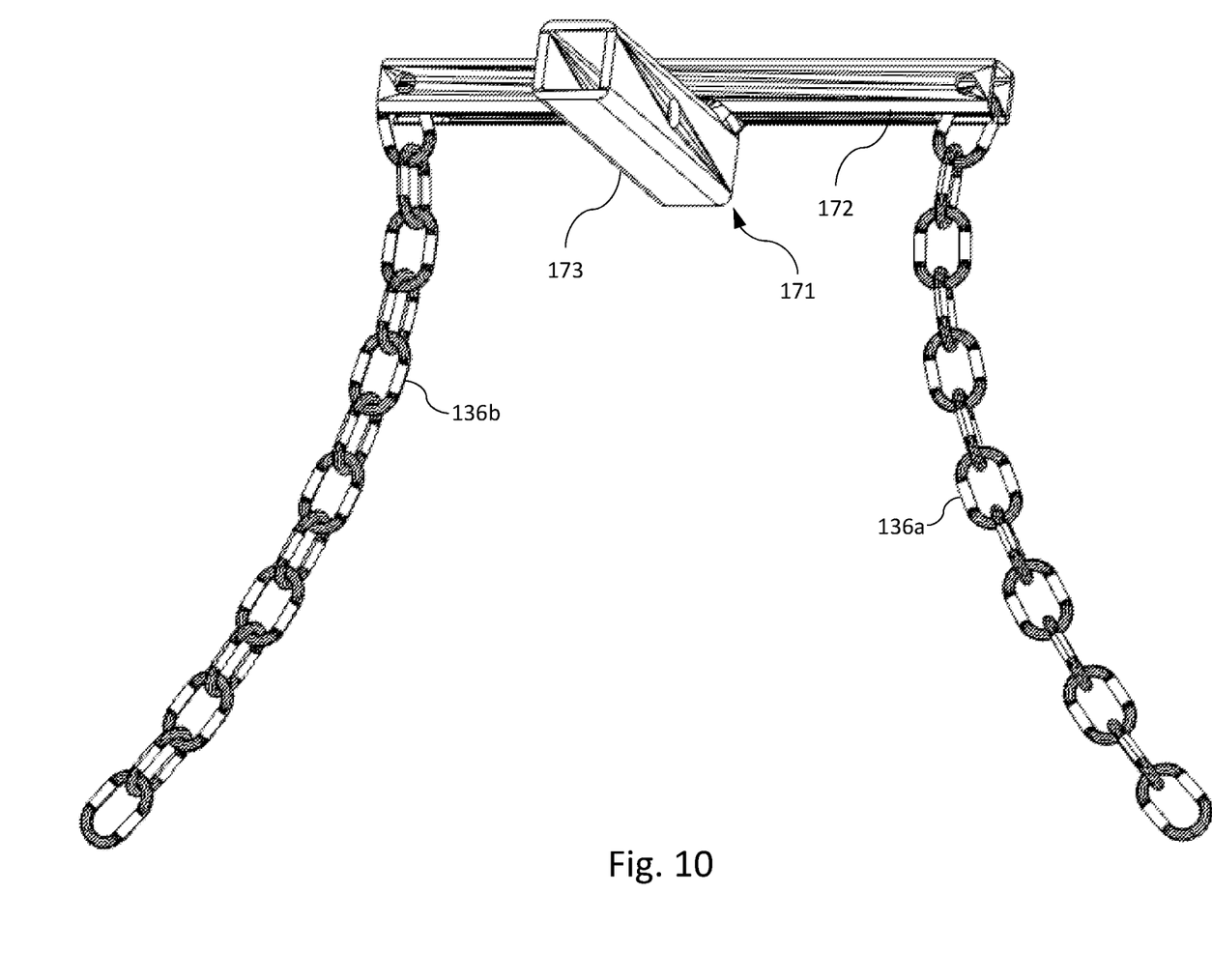
FIG. 10 is a perspective view of the connector bar of FIG. 9.

FIG. 9 illustrates the example articulating pitch-adjustable hitch 200 of FIG. 1 coupled with the work machine 100 by a connector bar 171 and coupled the surface conditioning tool 300. The connector bar 171 coupled with the lifting member 114. In the illustrated embodiment, the connector bar 171 is provided in an example T-bar configuration and includes a lateral bar member 172 which is coupled with flexible rigging members 136a, 136b, and a longitudinal bar member 173 which is coupled with and extends longitudinally forward of the lateral bar member 172 and is received by and coupled with the lifting member 114. The first flexible rigging member 136a is coupled with and extends between the connector bar 171 and a lateral frame member of the surface conditioning tool 300. In the illustrated embodiment a second flexible rigging member 136b is coupled with and extends between the connector bar 171 and the lateral frame member of the surface conditioning tool 300. In other embodiments, a single flexible rigging may be utilized. In the illustrated embodiment, the flexible rigging members 136a and 136b comprise lengths of chain. In other embodiments, the flexible rigging members 136a and 136b may comprise cables, lines, ropes, wires, or other types of flexible riggings. FIG. 10 illustrates the connector bar 171 and flexible rigging members 136a, 136b of FIG. 9 in isolation.

The connector bar 171 provides a single connection hookup for coupling the flexible rigging members 136a, 136b with the lifting member 114. Thus, the connector bar 171 permits a plurality of flexible rigging members 136a, 136b to be coupled with the work machine 100 via a single connection and a single connecting pin simplifying connection and disconnection of the surface conditioning tool 300 with the work machine 100 as well as the connection and disconnection of other tools with the work machine 100. Furthermore, the connector bar 171 in combination with the articulating pitch-adjustable hitch 200 provides a two-point hookup for coupling the surface conditioning tool 300 with the work machine 100 also simplifying the connection and disconnection of the surface conditioning tool 300 with the work machine 100 as well as the connection and disconnection of other tools with the work machine 100. The connector bar 171 also provides lateral spacing of the connection location of the flexible rigging members 136a, 136b relative to the lifting member 114. Such lateral spacing enhances lateral or side-to-side stability during lifting of the surface conditioning tool 300 and permits the length of flexible rigging members 136a, 136b reducing the swing arc of the surface conditioning tool 300 during lifting. The lateral spacing of the connection location of the flexible rigging members 136a, 136b relative to the lifting member 114 and the lateral frame member of the surface conditioning tool 300, and the length of the flexible rigging members 136a, 136b are preferably selected to provide rotation of the surface conditioning tool 300 about the Z-axis direction and centering of the surface conditioning tool 300 when raised.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus for coupling with a work machine, the apparatus comprising:
   a first elongate member configured to detachably couple with a work machine in a tow-behind configuration;
   a two-axis joint member coupled with the first elongate member at a first joint permitting rotation of the two-axis joint member relative to the first elongate member about a first axis of rotation;
   a rigid frame portion including a second elongate member coupled with the two-axis joint member at a second joint permitting rotation of the second elongate member relative to the two-axis joint member about a second axis of rotation perpendicular to the first axis of rotation and a third elongate member extending perpendicular to the second elongate member;
   a surface conditioning tool extending parallel to the third elongate member and coupled with the rigid frame portion at a third joint and at a fourth joint permitting rotation of the surface conditioning tool relative to the rigid frame portion about a third axis of rotation parallel to the second axis of rotation; and
   a rigid variable-length tool coupling member coupled with the rigid frame portion at a fifth joint and coupled with the surface conditioning tool at a sixth joint.

2. The apparatus of claim 1 wherein the two-axis joint member includes a fork portion coupled with the first elongate member at the first joint and an eye portion coupled with the second elongate member at the second joint.

3. The apparatus of claim 1 comprising a lifting member coupled with the rigid frame portion by a flexible rigging member, the lifting member being adjustable by an operator to raise and lower relative to the first elongate member.

4. The apparatus of claim 3 wherein the lifting member is adjustable to a first position wherein the surface conditioning tool is raised above an underlying ground surface and supported at least in part by the flexible rigging member.

5. The apparatus of claim 4 wherein the lifting member is adjustable to a second position lower than the first position wherein the surface conditioning tool contacts the underlying ground surface and the flexible rigging member is taut effective to prevent or limit rotation of the two-axis joint member relative to the first elongate member about the first axis of rotation.

6. The apparatus of claim 5 wherein the lifting member is adjustable to a third position lower than the second position wherein the surface conditioning tool contacts the underlying ground surface and the flexible rigging member is provided with a first degree of slack effective to permit a first range of rotation of the two-axis joint member relative to the first elongate member about the first axis of rotation.

7. The apparatus of claim 6 wherein a pitch of the tool relative to the underlying ground surface is adjustable independently from the position of the lifting member by varying the length of the variable-length tool coupling member.

8. The apparatus of claim 6 wherein the lifting member is adjustable to a fourth position lower than the third position wherein the surface conditioning tool contacts the underlying ground surface and the flexible rigging member is provided with a second degree of slack effective to permit a second range of rotation of the two-axis joint member relative to the first elongate member about the first axis of rotation, the second range of rotation being greater than the first range of rotation.

9. The apparatus of claim 8 comprising the work machine detachably coupled with the first elongate member.

10. The apparatus of claim 9 wherein a first end of the lifting member is coupled with and rotatable relative to the work machine and the lifting member is coupled with the flexible rigging member at a location spaced apart from the first end of the lifting member.

11. The apparatus of claim 9 wherein the lifting member is adjustable to a lowermost position wherein the surface conditioning tool contacts the underlying ground surface and the flexible rigging member is provided with a third degree of slack effective e to permit a third range of rotation of the two-axis joint member relative to the first elongate member about the first axis of rotation, the third range of rotation being greater than the second range of rotation.

12. The apparatus of claim 11 wherein the third range of rotation permits rotation of at least plus or minus 30 degrees.

13. The apparatus of claim 11 wherein work machine is a zero-turn radius work machine and the third range of rotation permits the surface conditioning tool to work an underlying ground surface about a centrally positioned circle with a radius of 2 feet or less.

14. The apparatus of claim 1 wherein the rigid frame portion comprises a T-shaped frame portion.

15. An apparatus comprising:
   a first elongate member configured to detachably couple with a work machine in a tow-behind configuration;
   a two-axis joint member coupled with the first elongate member at a first joint permitting rotation of the two-axis joint member relative to the first elongate member about a first axis of rotation;
   a rigid frame portion including a second elongate member coupled with the two-axis joint member at a second joint permitting rotation of the second elongate member relative to the two-axis joint member about a second axis of rotation perpendicular to the first axis of rotation and a third elongate member extending perpendicular to the second elongate member;

a lifting member coupled with the rigid frame portion by a flexible rigging member, the lifting member being adjustable by an operator to raise and lower relative to the first elongate member effective to rotate the second elongate member about the second axis of rotation; and a surface conditioning tool operatively coupled with the rigid frame portion.

16. The apparatus of claim 15 wherein with the surface conditioning tool contacting an underlying ground surface the lifting member is adjustable over a first range of motion wherein a range of rotation of the two-axis joint member relative to the first elongate member about the first axis of rotation is varied in response to variation in an amount of slack present in the flexible rigging member.

17. The apparatus of claim 16 wherein the first range of motion permits rotation of the two-axis joint member relative to the first elongate member of at least plus or minus 30 degrees.

18. The apparatus of claim 16 wherein the lifting member is adjustable over a second range of motion wherein the flexible rigging member is taut effective to prevent or limit rotation of the two-axis joint member relative to the first elongate member about a first axis of rotation and the surface conditioning tool is raised above the underlying ground surface.

19. The apparatus of claim 15 wherein the surface conditioning tool extends parallel to the third elongate member and is coupled with the rigid frame portion at a third joint and at a fourth joint permitting rotation of the surface conditioning tool relative to the rigid frame portion about a third axis of rotation parallel to the second axis of rotation.

20. The apparatus of claim 19 comprising a variable-length tool coupling member is coupled with the rigid frame portion at a fifth joint and coupled with the surface conditioning tool at a sixth joint.

* * * * *